US011327822B2

United States Patent
Ciabarra, Jr. et al.

(10) Patent No.: US 11,327,822 B2
(45) Date of Patent: *May 10, 2022

(54) TECHNIQUES FOR MONITORING USER INTERACTIONS AND OPERATION OF A WEBSITE TO DETECT FRUSTRATION EVENTS

(71) Applicant: Quantum Metric, Inc., Monument, CO (US)

(72) Inventors: Mario Luciano Ciabarra, Jr., Colorado Springs, CO (US); Joseph Eric Pastuer, Colorado Springs, CO (US)

(73) Assignee: Quantum Metric, Inc., Colorado Springs, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/857,067

(22) Filed: Apr. 23, 2020

(65) Prior Publication Data

US 2020/0250025 A1    Aug. 6, 2020

Related U.S. Application Data

(63) Continuation of application No. 15/671,530, filed on Aug. 8, 2017, now Pat. No. 10,656,984.

(Continued)

(51) Int. Cl.
*G06F 11/07* (2006.01)
*H04L 67/50* (2022.01)
(Continued)

(52) U.S. Cl.
CPC ........ *G06F 11/0757* (2013.01); *G06F 11/006* (2013.01); *G06F 11/0709* (2013.01);
(Continued)

(58) Field of Classification Search
CPC .... G06F 11/07; G06F 11/0757; G06F 11/006; G06F 11/0709; G06F 11/3006
See application file for complete search history.

(56) References Cited

U.S. PATENT DOCUMENTS 7,382,371 B1 * 6/2008 Ciabarra ............. G06F 11/3419
345/440
7,523,191 B1    4/2009 Thomas et al.
(Continued)

OTHER PUBLICATIONS

U.S. Appl. No. 15/671,530, "Final Office Action", dated Sep. 13, 2019, 15 pages.
(Continued)

*Primary Examiner* — Kamini B Patel
(74) *Attorney, Agent, or Firm* — Kilpatrick Townsend & Stockton LLP

(57) ABSTRACT

Techniques are disclosed for monitoring operation of and/or interaction with a website to detect events ("frustration events"). In at least one embodiment, a detection system is disclosed that can monitor a website for the same or unrelated interaction and operation to detect events that affect the performance of a website, while contributing to the frustration of user interaction with the website. The detection system can monitor interaction with and/or operation of one or more documents of a website. Interactions with a website, operations of the website, or a combination thereof, may be assessed with respect to a threshold defining an event. One or more criteria (e.g., a time period) of the event may be assessed for the interactions and operations. Event data may be generated for the event(s) that occur, and the event data may be sent to a host system to adjust operation of the website.

22 Claims, 8 Drawing Sheets

Related U.S. Application Data

(60) Provisional application No. 62/372,140, filed on Aug. 8, 2016.

(51) Int. Cl.

| | |
|---|---|
| *H04L 43/06* | (2022.01) |
| *G06F 11/00* | (2006.01) |
| *G06F 16/958* | (2019.01) |
| *H04L 67/02* | (2022.01) |
| *H04L 67/566* | (2022.01) |
| *H04L 67/10* | (2022.01) |
| *G06F 11/30* | (2006.01) |
| *G06F 11/34* | (2006.01) |

(52) U.S. Cl.
CPC ...... *G06F 11/3006* (2013.01); *G06F 11/3452* (2013.01); *G06F 16/986* (2019.01); *H04L 43/06* (2013.01); *H04L 67/02* (2013.01); *H04L 67/10* (2013.01); *H04L 67/22* (2013.01); *H04L 67/2833* (2013.01); *G06F 2201/81* (2013.01); *G06F 2201/86* (2013.01)

(56) References Cited

U.S. PATENT DOCUMENTS

| | | | |
|---|---|---|---|
| 7,941,525 B1 | 5/2011 | Yavilevich | |
| 8,892,685 B1 * | 11/2014 | Rajkumar | H04L 9/3226 |
| | | | 709/217 |
| 9,508,081 B2 | 11/2016 | Yavilevich | |
| 9,792,365 B2 | 10/2017 | Yavilevich | |
| 10,063,645 B2 | 8/2018 | Yavilevich et al. | |
| 10,079,737 B2 | 9/2018 | Schlesinger et al. | |
| 10,656,984 B2 * | 5/2020 | Ciabarra, Jr | H04L 43/06 |
| 2011/0004845 A1 * | 1/2011 | Ciabarra | G06F 3/0481 |
| | | | 715/808 |
| 2011/0185293 A1 * | 7/2011 | Barnett | H04M 3/5191 |
| | | | 715/760 |
| 2012/0089705 A1 * | 4/2012 | French | H04N 7/18 |
| | | | 709/219 |
| 2016/0188548 A1 * | 6/2016 | Ciabarra, Jr | G06F 40/123 |
| | | | 715/234 |
| 2016/0226976 A1 * | 8/2016 | Ciabarra, Jr | H04L 67/02 |
| 2017/0017650 A1 * | 1/2017 | Ciabarra, Jr | G06F 40/131 |
| 2017/0154366 A1 * | 6/2017 | Turgeman | G06Q 30/0277 |
| 2018/0034850 A1 * | 2/2018 | Turgeman | H04L 67/306 |
| 2018/0039530 A1 * | 2/2018 | Ciabarra, Jr | G06F 11/3006 |
| 2018/0373803 A1 * | 12/2018 | Shultz | G06F 3/0482 |
| 2019/0171542 A1 * | 6/2019 | Lackner | G06F 11/3419 |

OTHER PUBLICATIONS

U.S. Appl. No. 15/671,530, "Non-Final Office Action", dated Mar. 13, 2019, 17 pages.

U.S. Appl. No. 15/671,530, "Notice of Allowance", dated Jan. 14, 2020, 9 pages.

* cited by examiner

FIG. 3

TECHNIQUES FOR MONITORING USER INTERACTIONS AND OPERATION OF A WEBSITE TO DETECT FRUSTRATION EVENTS

CLAIM OF PRIORITY AND INCORPORATION BY REFERENCE

This application is a continuation of U.S. patent application Ser. No. 15/671,530, filed Aug. 8, 2017, entitled "TECHNIQUES FOR MONITORING USER INTERACTIONS AND OPERATION OF A WEB SITE TO DETECT FRUSTRATION EVENTS," which claims the benefit and priority under 35 U.S.C. 119(e) of U.S. Provisional Application 62/372,140, filed Aug. 8, 2016 entitled "TECHNIQUES FOR FRUSTRATION EVENT DETECTION," the entire contents of which are incorporated herein by reference for all purposes.

FIELD

The present disclosure relates generally to monitoring interactions with and operations of a website. More specifically, embodiments relate to techniques (e.g., systems, apparatuses, computer-readable media, and methods) for detecting events that relate to problems with accessing a website based on interaction with and operation of the website.

BACKGROUND

Since the introduction of client-side web technologies such as JavaScript, electronic documents (e.g., a web page) accessed on the Internet have become increasingly dynamic. Accessing a data table in a document to sort columns or filter data, changing a Document Object Model (DOM) element opacity/location/dimensions/content, and asynchronously fetching and displaying data are just some examples of how web documents have become progressively richer with dynamic content and interactions.

An application on a client may allow users to view and interact directly with an electronic document in various ways including, without limitation, clicking on interactive elements to interact with or reload a document, navigating between documents, and requesting content to be displayed in a document. An interaction with a document may result in processing delays to present the document and/or load content based on the interaction. For example, interaction with a document may result in a time-consuming request to a server for a content change. A delay in processing the request may limit a user's ability to view and/or interact with the document. In another example, an interaction with a document results in delays or an error in execution of program code configured to execute for a document.

Because electronic documents are dynamic within an application on a client, operators that provide the documents do not have a clear insight into how their audience encounters and reacts to problems in accessing electronic documents. Despite having created the content for a document, but because of the large amount of permutations of how users can interact with an individual document or groups of documents, users (e.g., providers, designers, operators, and document creators) may seek to determine the problems that users have in interacting with electronic documents. Traditionally, network to desktop browsers was viewed as reliable and adhering to fairly consistent and predictable performance patterns. In the new environment where users increasingly access data from any device, and over widely varying network conditions, the proposition that performance is consistent is no longer valid. Users may see only partial content before getting frustrated and leaving a page or website. They may get frustrated due to content that does not even come from the primary website, but instead is sourced from Content Distribution Networks or external advertising or social media sites. Users may get frustrated over delays in loading and/or accessing content for a document. An administrator of a website may be unable to identify a source of issues with accessing web documents.

Products can also capture user interaction events on a remote web document. Specifically with respect to capturing mouse clicks and mouse movement, systems have approached tracking of these types of events by capturing the Cartesian coordinates where a mouse moves, and the Cartesian coordinates of where a user performs mouse clicks. This has been moderately effective in the past. However, as the number of devices used to access web documents increase and the number of varying screen displays increases, web designers have transitioned to a more dynamic, or responsive, document design and operation, where the content layout changes dynamically based on the client's screen size. As such, simply capturing Cartesian coordinates is ineffective and inaccurate at helping web operators and designers analyze how users interact with their document, as the results are not clear with respect to what the user clicked or what content a mouse went over, in, or out of Documents of a website may change dynamically with regard to a DOM defining a structure of content on the website. Documents may be related to one another such that interaction with one document affects presentation of a different document. Even more difficult is determining how unrelated events affecting interaction with or operation of a website may be correlated to a single issue with operation of the website. Such events may cause frustration with use of the website, without a host system hosting the website being fully aware of the significance of such events. Detecting related events may be difficult as websites shift towards dynamic implementations.

As a result of these challenges, computer systems that host a website are challenged with ways to detect issues in operation of a website, some issues of which lead to frustration by users of the website. These issues may affect the performance of the computers that host a website. A tremendous amount of financial and computing resources are expended to detect, if at all possible, and correct these issues to limit their exposure to the user's experience of the website.

SUMMARY

Techniques (e.g., systems, methods, and computer-readable storage media) are disclosed for monitoring operation of and/or interaction with a website to detect events (also referred to herein as "frustration events"). Such events, aside from causing frustration to a user accessing a website, may affect performance of a website. In at least one embodiment, a detection system is disclosed that can monitor a website for the same or unrelated interaction and operation to detect events that affect the performance of a website, while contributing to the frustration of user interaction with the website. Host systems may not be able to detect such events, much less events that are based on unrelated interactions and/or operation on a website. Further such host systems may not be able to correlate issues with a website across multiple users on different client devices.

In at least one embodiment, the detection system can monitor interaction with and/or operation of one or more documents of a website. Interactions and operations may be monitored with respect to a policy that defines threshold for monitoring different types of events. In some embodiments, interactions and operation may be monitored together as they relate to a specific type of event to be detected. The detection system may assess each interaction and operation, or a combination thereof, with respect to a threshold. Threshold(s) may be assessed with respect to interactions with and/or operations of a website by multiple users, multiple devices, or combinations thereof defined by a policy for events.

An event may be defined based on one or more criteria, such as time. Based on determining that one or more thresholds defining an event are satisfied, the detection system may determine one or more attributes to determine whether an event is detected. For example, the detection system may determine whether the thresholds are satisfied within a time period defining the event. Based on determining that an event is detected, event data may be generated for the event. The event data may include information about a session of access to the website, a location of documents accessed, information about the interactions (e.g., where, when, and how), and information about the operations. The event data may be displayed and/or communicated to another computer system. For example, the event data may be sent to a computer system that is hosting the website to enable the computer system to adjust operation based on the event data.

In some embodiments, a computer system may be implemented for a detection system. The computer system may be configured to implement techniques disclosed herein. The computer system may include a memory coupled to one or more processors, the memory storing instructions, where the instructions, when executed by the one or more processors, cause the one or more processors to perform one or more methods or operations described herein. In at least one embodiment, the one or more processors and the memory are included in a mobile communication device. Yet other embodiments relate to systems, consumer devices, computer program products, systems, and machine-readable storage media, which can employ or store instructions to cause methods and operations described herein to be performed.

A better understanding of the nature and advantages of embodiments of the present disclosure may be gained with reference to the following detailed description and the accompanying drawings.

BRIEF DESCRIPTION OF THE DRAWINGS

FIGS. 3-5 illustrate examples of frustration events detected in documents displayed in applications according to some embodiments.

DETAILED DESCRIPTION

Figure 1:
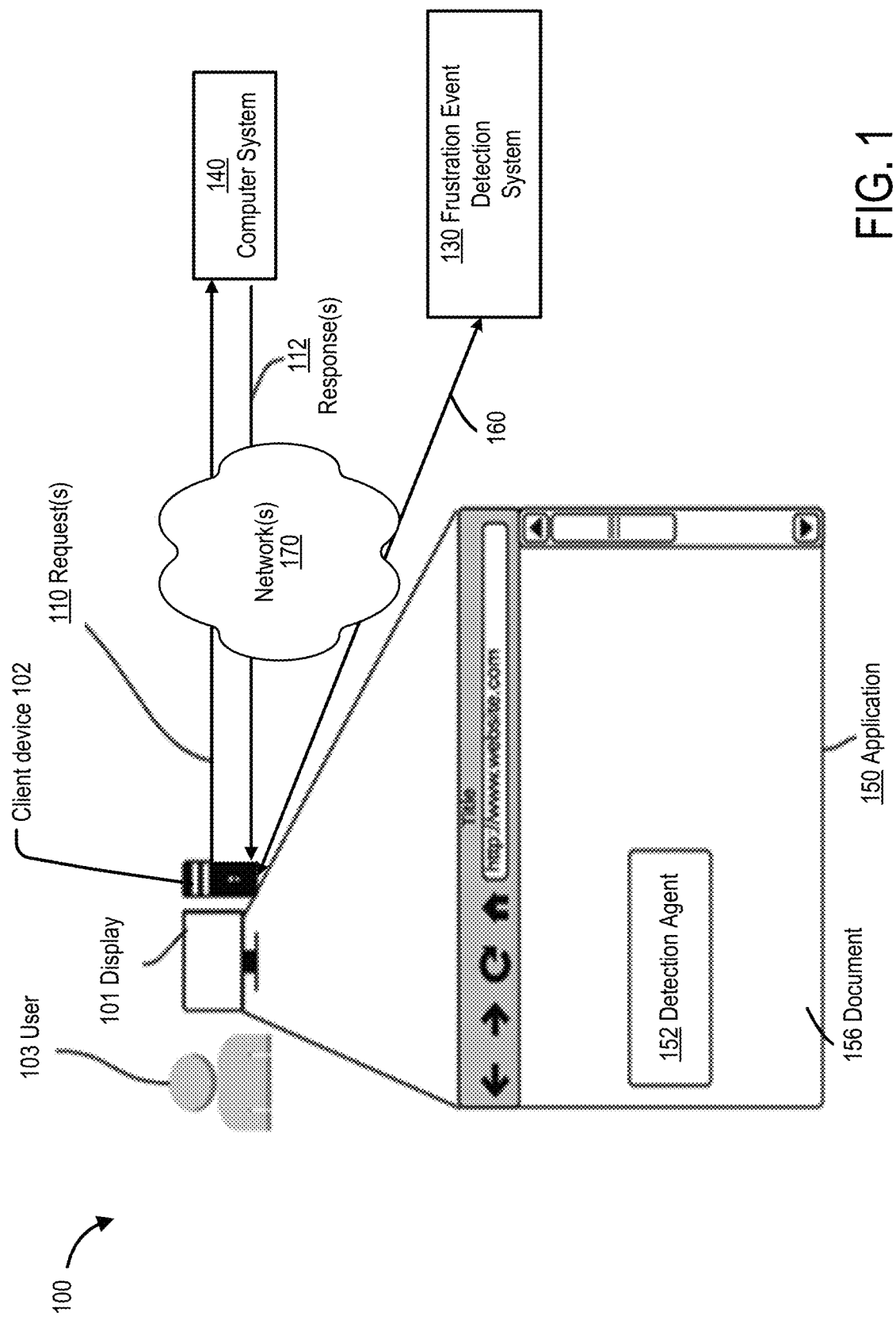
FIG. 1 illustrates a high-level architectural diagram of a system for detection of frustration events according to some embodiments.

The Internet continues to expand every day with more websites and enhancements to technology to improve navigation of content within a website. The increase in websites and the change in technology may contribute to an increase in user frustration for navigating many websites. The aggregate of thousands, if not more, users of a website at any given time experiencing an issue may further impact the performance of the website contributing to more frustration in user access. In response, users may alter their operation, such as request access or function of the website to achieve a desired result. The altered operation of users may further cause performance issues with an increase in traffic for accessing the website as those users may attempt to repeatedly access the website in the manner as previously done leading to the issues. These issues may lead to challenges in efficiently operating a dynamic website and minimizing the effect on performance for operating a website by detecting frustration events.

What is needed is a technique for determining frustration events related to navigating electronic documents (e.g., webpages) for websites. A frustration event detection system (also referred to herein as "detection system" and "event detection system") is disclosed herein for identifying different types of frustration events related to navigating content on the Internet. By monitoring the interaction with a document and other events related to functionality for the document, a frustration event detection system can detect events ("frustration events") in which users are struggling (e.g., experiencing lack of response or limiting functionality) to interact with the document. The detection system can aggregate data, in real-time from one or more client devices, including multiple users, about interaction with and operation of a website. The frustration events may be detected for a website with respect to a user, a device, and/or one or more documents of a website. The detected events and data about the event may be communicated to a host system of a website to help adjust operation of the website in view of the detected events. The detection of events may be configurable, being customized based on the issues an operator of a website is trying to monitor. The data provided to an operator enables the operator to prioritize which items to fix. The aggregated data may enable operators to determine statistical information about the events, such as the number of users experiencing the issue, and potential financial impact of the issue. The aggregated data can be sent to a system that provides a website in which documents are associated with detected frustration events. The data about frustration events may be useful to identify problems with different versions of a website. As such, a different or new version of a website may be presented to a user based on detecting frustration events for a previous version of the website. The aggregated data can be used to trigger dynamic sites changes, a survey, redirect users to support, give them a coupon, or any number of interactions to improve the user's experience.

I. High-Level Architecture of Frustration Event Detection System

FIG. 1 illustrates a generalized example of a system 100 as a high-level architectural diagram for a frustration event detection system (also referred to herein as "detection system" and "event detection system"). One or more of the below-described techniques may be implemented in or involve one or more computer systems. System 100 is not intended to suggest any limitation as to scope of use or functionality of described embodiments.

The system 100 may include one or more "clients" or client systems (e.g., client application or client device), such as a client device 102. System 100 may include a computer system 140 (e.g., a web server computer). Clients may be operated by users, such as user 103. Computer system 140 may be operated by a user (e.g., an administrator). Clients can communicate with computer system 140 to exchange data via one or more communication networks (e.g., a network 170). Examples of a communication network include, without restriction, the Internet, a wide area network (WAN), a local area network (LAN), an Ethernet network, a public or private network, a wired network, a wireless network, and the like, and combinations thereof.

Communications between clients and computer system 140 may include one or more requests 110 and/or one or more responses 112. A communication session (e.g., a web session) may be established between client device 102 and computer system 140 to exchange communications via network 170. Computer system 140 may be implemented to store electronic documents, such as a collection of web documents for a website. In some embodiments, clients may communicate with computer system 140 by transmitting a request 110 along network 170 to computer system 140. For example, a request from client device 102 to computer system 140 may be a request for an electronic document (e.g., a web page) accessed from a URL at client device 102. A response 105 from a computer system 140 to client device 102 may be a response providing the web page requested by client device 102. The communications exchanged in system 100 may be transmitted via one or more data packets. Data packet(s) that are received may be reassembled to yield a communication, such as a request or a response. Requests and responses may be transmitted via one or more network devices.

Requests and responses may include data, such as consumer data and/or enterprise data. The data may include an electronic document (also referred to herein as "a document"). Data as disclosed herein may be referred to as "cloud data," which is distinguishable as data in a cloud-based environment. An electronic document (also referred to herein as a "document" accessed on the Internet (e.g., the web) may be referred to herein as a document of a website. For example, an electronic document may be a "web document" or a "web page" of a website. Data may be received from a computer system, data may be sent to a computer system, data may be processed by a computer system, or combinations thereof. Cloud data and/or enterprise data may be distinguishable from consumer data for consumer applications and/or services. Cloud data may include data accessed in a system including an enterprise system. In certain embodiments, data may include data processed, stored, used, or communicated by an application or a service executing in a computer system. For example, data includes objects. Data may be in a format, such as a JSON (JavaScript Object Notation) format from enterprise applications. Data may include structured data (e.g., key value pairs), unstructured data (e.g., internal data processed or used by an application, data in JSON format, social posts, conversation streams, activity feeds, etc.), binary large objects (BLOBs), documents, system folders (e.g., application related folders in a sandbox environment), data using representational state transfer (REST) techniques (referred to herein as "RESTful data"), system data, configuration data, synchronization data, or combinations thereof. In some embodiments, data in communications 110, 112 may include a resource such as a document as referenced herein. A resource, such as a document, may include a document extended markup language (XML) files, HTML files (e.g., a web page), JavaScript files, visual assets, configuration files, media assets, a content item, etc., or a combination thereof. For example, a resource may be a web page in an HTML format referenced by uniform resource information (URI), e.g., a uniform resource locator (URL). A BLOB may include a collection of binary data stored as a single entity in a database management system, such as an image, multimedia object, or executable code, or as otherwise known in the art.

System 100 can include a frustration event detection computer system 130 (also referred to herein as a "detection system" and "event detection system") that performs techniques disclosed herein for detecting frustration events associated with accessing documents. In some embodiments, a frustration event detection system may be implemented at client device 102, computer system 130, or a combination thereof. Computer system 130 may provide a service or an application that enables a user to detect frustration events. Computer system 130 may be implemented as part of client device 102, computer system 140, or a combination thereof. Computer system 130 may be communicatively coupled (e.g., via a network 170) to one or more elements in system 100. For example, computer system 130 may be communicatively coupled to client device 102 via connection 160 through network 170. Computer system 130 can be communicatively coupled to computer system 140 via network 170.

Computer system 130 and client device 102 may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. Computer system 130 may run any of operating systems or a variety of additional server applications and/or mid-tier applications, including HTTP servers, FTP servers, CGI servers, Java servers, database servers, and the like. Exemplary database servers include without limitation those commercially available from Microsoft, and the like. Computer system 130 may be implemented using hardware, firmware, software, or combinations thereof. In one example, computer system 130 may include or implement a service (e.g., a Software as a Service, an Infrastructure as a Service, or a Platform as a Service) or a product (e.g., a computer program product) provided by Quantum Metric, LLC. In various embodiments, computer system 130 may be configured to run one or more services or software applications described in the foregoing disclosure. For example, computer system 130 may perform processing as disclosed herein according to an embodiment of the present disclosure.

Client device 102 may include or be coupled to a display 101. Client device 102 may provide access to one or more applications, such as application 150. Application 150 may be a browser enabling user 103 to view resources, such as documents. In at least one embodiment, system 100 may include an agent 152 ("detection agent") that can detect frustration events in system 100. Detection agent 152 may operate in communication with computer system 130 to provide a service or an application that enables a user to detect frustration events.

Detection agent 152 may be implemented with program code (e.g., an application) that resides on client device 102, computer system 130, computer system 140, or a combination thereof. For example, detection agent 152 may be implemented using JavaScript that is embedded in a document (e.g., web page 156) of a website that can identify and obtain data that is displayed at client device 102. Detection agent 152 may be client-side such that it is implemented at client device 102. Detection agent 152 can be sent in communications to client device 102. Detection agent 152 may communicate with computer system 130 to coordinate frustration event detection. Detection agent 152 may perform operations disclosed herein as being performed by a client. In some embodiments, detection agent 152 may be received from computer system 130. Detection agent 152 may be deployed to client device 102 as part of a service provided by computer system 130. Detection agent 152 may be configured for communication with detection system 130. Detection agent 152 may gather data on behalf of detection system 130. In some embodiments, detection agent 152 may perform specialized functions to gather and prepare data in a format for detection system 130 to process in detecting frustration events.

Agent 152 may have more or fewer subsystems and/or modules than shown in the figure, may combine two or more subsystems and/or modules, or may have a different configuration or arrangement of subsystems and/or modules. Subsystems and modules of agent 152 may be implemented in software (e.g., program code, instructions executable by a processor), in firmware, in hardware, or combinations thereof. The subsystems and/or modules of agent 152 may be implemented to perform techniques disclosed herein. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes disclosed herein. Agent 152 may store or be implemented as program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations disclosed herein.

In some embodiments, computer system 130 and client device 102 may be implemented using a computing system comprising one or more computers and/or servers that may include those described above. The computing system may be implemented as a cloud computing system. Computer system 130 and client device 102 may include several subsystems and/or modules, including some, which may not be shown. Computer system 130 may have more or fewer subsystems and/or modules than shown in the figure, may combine two or more subsystems and/or modules, or may have a different configuration or arrangement of subsystems and/or modules. Subsystems and modules of computer system 130 may be implemented in software (e.g., program code, instructions executable by a processor), in firmware, in hardware, or combinations thereof. The subsystems and/or modules of computer system 130 may be implemented to perform techniques disclosed herein. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes disclosed herein. Computer system 130 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations disclosed herein.

Computer system 130, client device 102, and agent 152, individually or in combination, may provide other services and/or software applications in a virtual or non-virtual computing environment. For example, computer system 130 may be configured to run one or more of these services or software applications described in the foregoing disclosure. Such services may be offered on-demand to users of client device 102. Services may be facilitated or accessed by agent 152. In some embodiments, a specific instantiation of a service provided by computer system 130 may be referred to herein as a "service." Users operating client device 102 may use one or more applications to interact to utilize the services or applications provided by computer system 130. Services may be offered as a self-service or a subscription. Users can acquire the application services without the need for customers to purchase separate licenses and support. Examples of services may include a service provided under a Software as a Service (SaaS) model, a web-based service, an enterprise service, a cloud-based service, or some other service provided to client device 102 via network 170. A service made available to a user via network 170 (e.g., a communication network) from computer system 130 is referred to as a "cloud service." In some embodiments, computer system 130 may host an application, and a user may, via network 170, access the application at client device 102 on demand. Users operating client device 102 may in turn utilize one or more applications to interact with computer system 130 to utilize the services provided by subsystems and/or modules of computer system 130.

In some examples, a service may be an application service may be provided computer system 130 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications executing in computer system 130, which may be implemented as a cloud computing system. The cloud computing system may be implemented as a cloud-based infrastructure that is accessible via network 170. Various different SaaS services may be provided.

Computer system 130, client device 102, and agent 152 may each also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, computer system 130 may be coupled to or may include one or more data stores. The data store(s) may store templates, edit scripts, and other information for the operations disclosed herein. The data store(s) may be implemented to store data using one or more data structures (e.g., a hash table). The data store(s) may be accessible to perform search and retrieval of data stored in the data store(s). The data store(s) may store data to perform event detection and to store information about detected events as disclosed herein. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

In at least one embodiment, a web session may begin with a user 103 on a web browser 150 initiating the browser request 110 for a document 156 from computer system 140. The user 103 may initiate the browser request 110 on a client device 102.

Once the computer system 140 has received the request, it may transmit a response 112 and return to the client device's 102 web browser 150. The response 112 of the computer system 140 may include the web document 156 requested by the user 103. The computer system 140 may further include within the response 112 a Document Object Model (DOM), such as a hypertext markup language (HTML) DOM. The document 156 may be rendered according to the DOM. In one embodiment, the web document 156 may contain a reference to the detection agent 152 (e.g., JavaScript code), which can then be fetched as a result from computer system 130. The detection agent 152 could also be sent separately from the web document 156. Regardless, the detection agent 152 would be sent in conjunction with the web document 156, such that the detection agent 152 can detect information about and operation of a website including the web document 156. Being configured for communication with the detection system 130, the detection agent 152 can provide the detection system 130 with data detection of interaction with and operation of a website. Detection agent 152 can monitor interaction with a website via input to a client and can monitor operation of the website with respect to functions for displaying the website and/or communication with a host system hosting the website. As discussed below, detection system 130 operating with detection agent 152 can detect events related to operation of and/or interaction with a website to identify events that may cause frustration to operation and/or performance of the website.

The detection agent 152, detection system 130, or a combination thereof may perform operations disclosed herein to detect frustration events and to record information about those frustration events. Information about frustration events may be stored by the detection system, presented in a graphical interface at a client device/computer system, and/or communicated to another system, such as computer system 140 that provides documents for a website.

Figure 2:
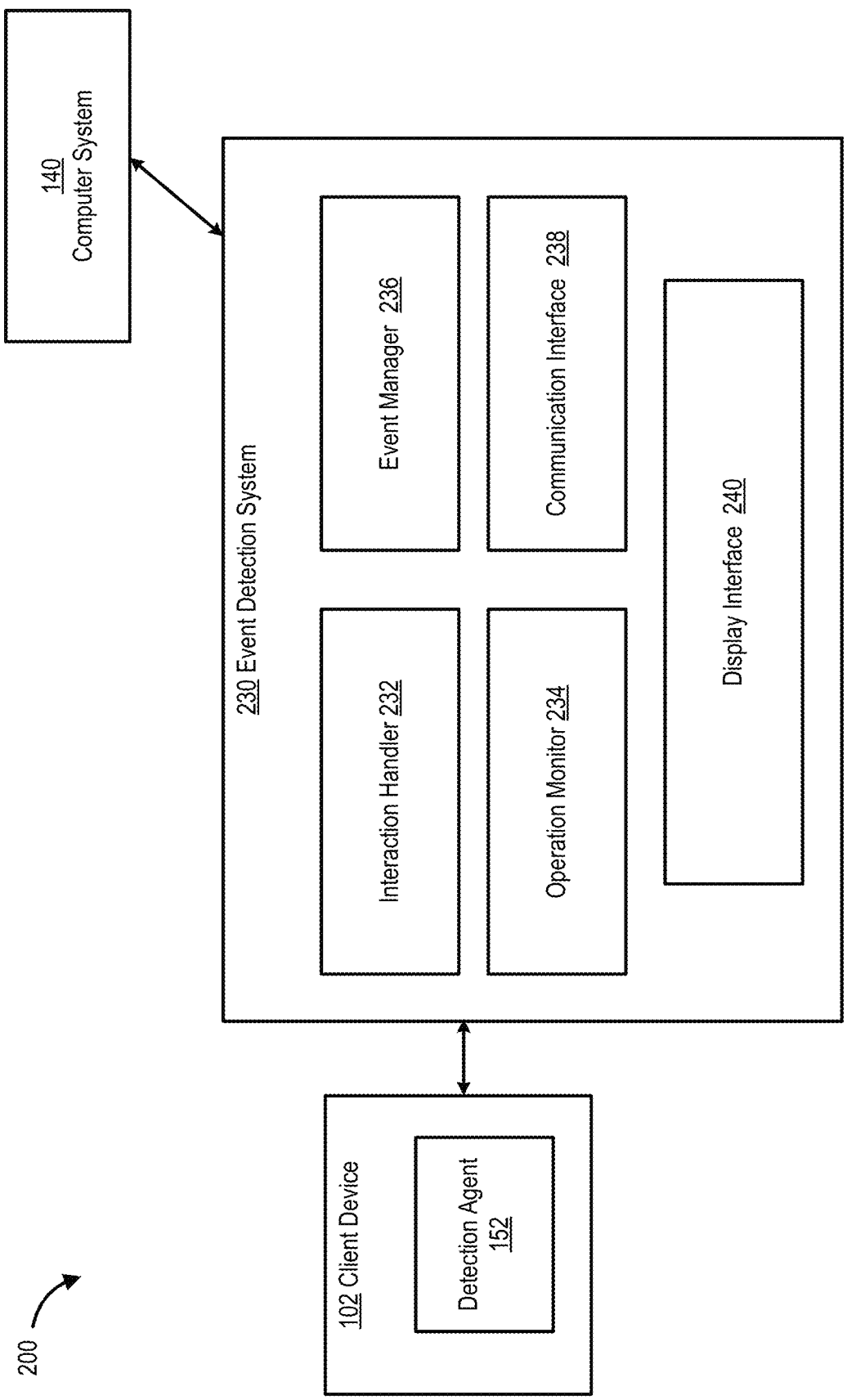
FIG. 2 illustrates a detailed block diagram of a system for detection of frustration events according to some embodiments.

Now turning to FIG. 2 is a system 200 showing a detailed view of a frustration event detection system. System 200 includes a computer system 230, which may have more or fewer subsystems and/or modules than shown in the figure, may combine two or more subsystems and/or modules, or may have a different configuration or arrangement of subsystems and/or modules. Subsystems and modules of system 230 may be implemented in software (e.g., program code, instructions executable by a processor), in firmware, in hardware, or combinations thereof. The subsystems and models are disclosed for illustrations of some embodiments. The subsystems and modules may implemented in detection system 130, detection agent 152, or a combination thereof.

System 230 may include an interaction handler 232 that monitors and handles input by a user for accessing website, including one or more documents of a website. Interaction handler 232 may be configured to detect input and/or interaction with a document by a user on a device (e.g., a client device). Input may be monitored and/or obtained according to techniques disclosure in Section II, which may include using a programming interface and/or other tools available on a client device or through a third party system. Interaction handler 232 may be implemented in detection agent 152 that is on a client device accessible to monitor and access input. In some embodiments, detection agent 152 may facilitate obtaining and providing input and/or detected interactions with a document to detection system 230.

Based on detecting input and/or access of a document, interaction handler 232 may perform processing to detect one or more interactions. Interactions may be monitored and detected according to techniques disclosed herein. Detecting an interaction may include processing the input to determine the interaction (e.g., a mouse click, a mouse click of an element, or an input of text into an element) and information about the interaction (e.g., a type of interaction, a frequency of the interaction, and information about a location of the interaction). Interaction handler 232 may perform processing to monitor interactions with respect to one or more thresholds. A threshold for monitoring interaction with a website may be defined based one or more criteria defining a type of event sought to be monitored. A threshold may be configured with respect to detecting a type of event.

System 230 may include an operation monitor 234 that monitors operation of a website, in particular documents of the website. Operation monitor 234, like input handler 232, may work with detection agent 152 to obtain information about users accessing a website on a client device including monitoring communication with a computer system (e.g., computer system 140). Operation monitor 234 may monitor operation of a website according to techniques disclosed herein. Operation of a website may include functionality for accessing a document, rendering a document and/or any functions or features in the document, functionality of a document based on an interaction with the document, obtaining a document, or other features related to operation of a document. Operation monitor 234 may monitor and/or intercept communication between a client device and a computer system 140. Operation monitor 234 may monitor operations, for example, by monitoring communication for accessing a document, such as requests to reload a document and/or access a different document from one document. Operation monitor 234 may observe changes in a document, such as a change in a DOM object of a website, with respect to user interaction with a document. Examples of monitoring operations of a document are described below with reference to techniques for detecting events.

Operation monitor 234 may perform processing to monitor operations with respect to one or more thresholds. A threshold for monitoring operation of a website may be defined based one or more criteria defining a type of event sought to be monitored. A threshold may be configured with respect to detecting a type of event.

Based on detecting that a threshold is satisfied, both of operation monitor 234 and interaction handler 232 may communicate with an event manager 236 to provide information about the threshold and whether it has been satisfied. Both interaction handler 232 and operation monitor 234 may provide information that is detected about the interaction and operation to enable event manager 236 to determine details about an occurrence of an event.

System 230 may include event manager 236 that determines events (e.g., frustration events) based on information provided by interaction handler 232 and operation monitor 234. Event manager 236 may determine a time period when an event occurs based on assessing the occurrence of interactions and operation with respect to threshold(s). One or more thresholds may be defined based on events to be detected. Examples of thresholds and events are described with reference to Section II. Events may be configurable based on a policy. The policy may be adapted based on rules and/or different learning techniques (e.g., supervised and unsupervised).

Event manager 236 can generate event data for events that are detected. The data may include information obtained about interactions from interaction handler 232 and information obtained from operation monitor 234. The event data may include session information about a session for accessing a website when an event occurs, a location of the document(s) accessed during the event, and details about each of the events. Event manager 236 may provide or make accessible the event data to either or both of the communication interface 238 or display interface 240.

Event manager 236 may generate a classification for operation of and/or interaction with the website. As described in this disclosure, the monitoring of operation of documents for a website and the threshold(s) that are satisfied can be assessed with respect to possible issues with operation of a website. A classification may be defined based on one or more thresholds that are satisfied during a time period. Examples of classifications are described with reference to Section II "Techniques for Detecting Events Related to Interaction With and/or Operation of a Website."

In some embodiments, a classification may be based on information about a website. For example, a classification may be based on session information including documents that were accessed and if those documents were part of a specific process (e.g., commerce). The weighting for a classification may be based on the information about a website. In another example, a classification may be based on severity of an issue, such as how many users and/or devices encountered the same event. In another example, other statistical information may be considered for classifying an event with respect to a user, such as past behavior including past classifications and access of the website. Generally, a classification may be based on factors that relate to struggle for accessing the website in view of the events that are detected. For example, a classification may be based on some or all of the following factors, such as a type of document or process (e.g., funnel process for commerce), abandon cart rates of a user, presence on website, number of pages visited, a measure of times a user has visited a website, registered user, and LTV (lifetime value) of a user.

System 230 may include communication interface 238 that communicates and/or facilitates communication with client devices and computer systems (e.g., computer system 140), such as host systems that provide a website. Communication interface 238 may provide a callable interface that is based on one or more programming interfaces. The callable interface may facilitate communication, including push and pull communication techniques. Communication interface 238 may communicate using network 170, supporting communication protocols supported by any of the elements with which system 230 communicates. Communication interface 238 may communicate with computer system 140 and/or messaging platforms to provide event data. The event data may cause a computer system to adjust its operation and/or may cause the computer system to display information about the events. For example, the event data may facilitate a host system to adjust operation of a website based on events for operation that are detected.

System 230 includes display interface 240 that renders and/or provides a graphical interface to be displayed at a display device, e.g., a display device 101. Event data and other information about detected events may be presented in a graphical interface, e.g., a dashboard. The graphical interface may show information such as statistics and event information about events that are detected.

II. Techniques for Detecting Events Related to Interaction with/Operation of a Website The examples of detecting frustration events disclosed herein are described according to some embodiments. These examples are described with reference to system 100 of FIG. 1. The processes and/or operations disclosed herein may be performed by detection agent 152, detection system 130, or a combination thereof. System 200 may implement the techniques disclosed in this section. Detection agent 152 and detection system 130 may communicate with each other as part of performing frustration event detection. Examples disclosed herein may be described as a process, which may be depicted as a flowchart, a flow diagram, a data flow diagram, a structure diagram, a sequence diagram, or a block diagram. Although such diagrams may describe operations as a sequential process, all or some of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function. Although some techniques may be described as being performed at one element of system 100, such as at a client 102 or computer system 130, the techniques may be performed in a variety of different combinations. For example, some or all of the features of computer system 130 may be implemented at a client device 102, or vice versa.

The processes disclosed herein may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some embodiments, the processes depicted in flowcharts herein can be implemented by one or more computer systems depicted in FIG. 1. The particular series of processing steps in this disclosure are not intended to be limiting. Other sequences of steps may also be performed according to alternative embodiments. For example, alternative embodiments of the present disclosure may perform the steps outlined above in a different order. Moreover, the individual steps illustrated in the figures may include multiple sub-steps that may be performed in various sequences as appropriate to the individual step. While processing disclosed herein may be described with respect to a single document, such processing may be performed for multiple documents. Furthermore, additional steps may be added or removed depending on the particular applications. One of ordinary skill in the art would recognize many variations, modifications, and alternatives.

In at least one embodiment, a system can include one or more processors and a memory accessible to the one or more processors, the memory comprising instructions that, when executed by the one or more processors, cause the one or more processors to perform operations disclosed herein. In at least one embodiment, a computer product is disclosed comprising a computer readable medium storing a plurality of instructions for controlling a computer system to perform an operation of any of the method disclosed herein. A system is disclosed herein including a computer product implementing any of the operations disclosed herein, and including one or more processors for executing instructions stored on the computer readable medium included in the computer product. In some embodiments, a system can include means for performing any of the methods disclosed herein. In some embodiments, a system can be configured to perform any of the methods disclosed herein. In at least one embodiment, a system can include modules that respectively perform the steps of any of the methods disclosed herein.

In an aspect of some embodiments, each process disclosed herein can be performed by one or more processing units. A processing unit may include one or more processors, including single core or multicore processors, one or more cores of processors, or combinations thereof. In some embodiments, a processing unit can include one or more special purpose co-processors such as graphics processors, digital signal processors (DSPs), or the like. In some embodiments, some or all of processing units can be implemented using customized circuits, such as application specific integrated circuits (ASICs), or field programmable gate arrays (FPGAs).

The following sections describe some embodiments based on different scenarios in which events can be detected.

a. Detection of Rage Clicking Interaction

A frustration event detection system ("detection system") disclosed herein 130 can monitor one or more interactions (e.g., a selection or a click in) with an electronic document rendered in an application by a client device (e.g., client device 102). The electronic document may be provided by computer system 140. The electronic document may represent a web page of a website. For example, the electronic document may be structured in a hypertext markup language (HTML) format. The electronic document may be structured based on a document object model (DOM) object of the website.

The interaction may be monitored with regard to the location of the interaction (e.g., coordinates such as an x-axis and a y-axis position of a mouse) within the document and other information about the interaction. For example, the detection system may monitor clicking events using code defined for a programming interface (e.g., window.addEventListener ("onclick")). The information monitored may include the time or the number of occurrences of an interaction, a type of interaction, an element of an electronic document for which the interaction occurs, the website for which the interaction occurs, or other information about the document. The detection system may identify and store information about monitoring the interaction(s). The detection system may manage information (e.g., a counter) about interactions. The information may be updated based on an occurrence of an interaction.

Based on monitoring the interaction with the document, the detection system may determine whether an interaction threshold is satisfied. An interaction threshold may be defined by one or more criteria. The criteria may be defined based on the aspect of the interaction that is monitored. The criteria may include the number of occurrences of a type of interaction, the number of interactions (which can be different), a time period of one or more interactions, the location of the interaction in the document, or other criteria related to interaction with the document. For example, the threshold may be defined based on a number of clicks within the document during a time period of 2 seconds. The criteria for the threshold may be user-defined and/or based on a learning system (e.g., machine learning or user-assisted learning) from previous interactions and events that are detected. The threshold may be adaptable based on previous interactions monitored and events that are detected. Upon determining that a threshold is not satisfied, the detection system may reset monitoring such that subsequent interactions are monitored from a new starting time period.

Figure 3:
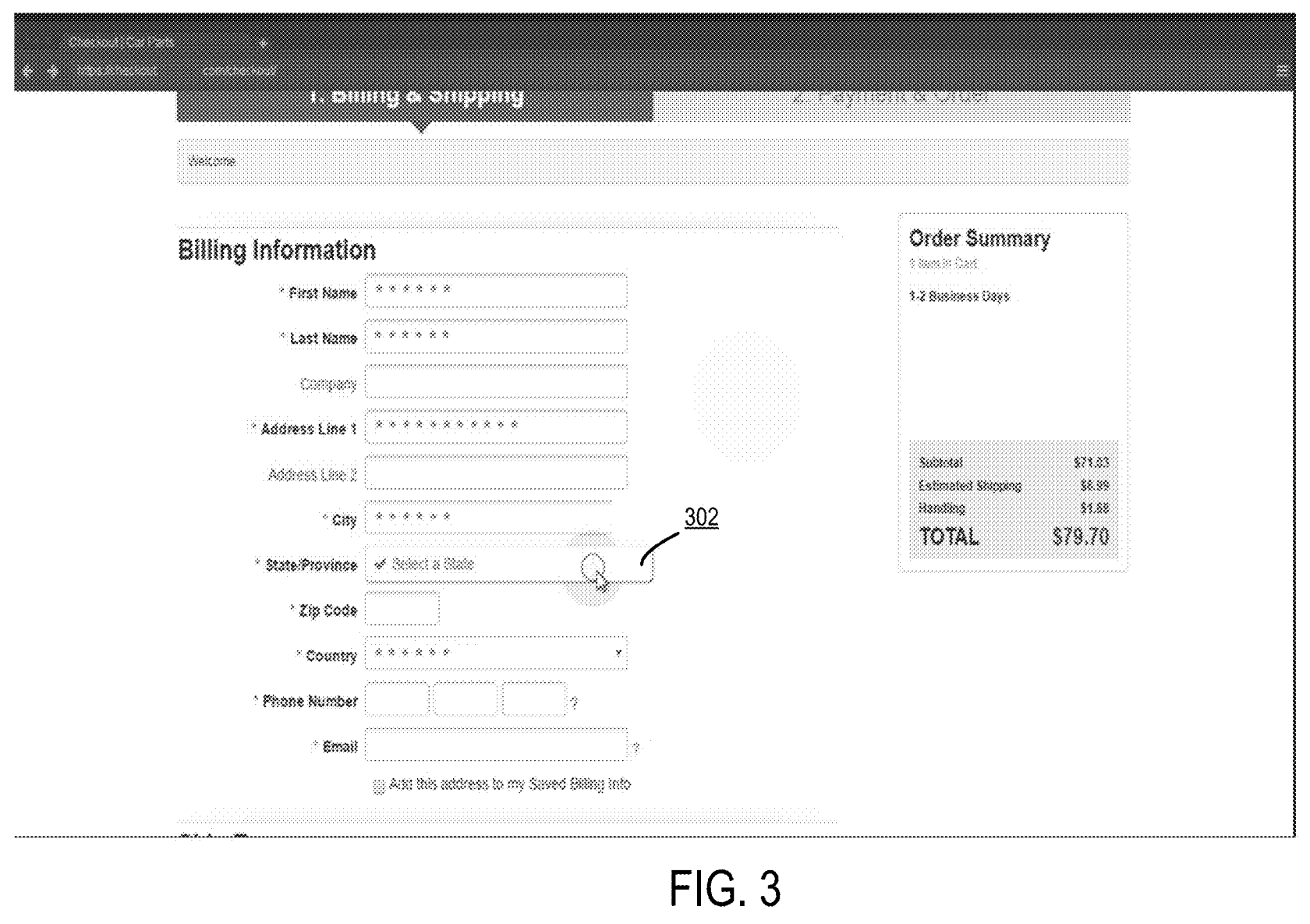

An event (e.g., a frustration event) may be detected based on monitoring the interaction(s) with a document. An event may be detected base on a threshold being satisfied (e.g., the criteria for a threshold being satisfied). For example, a threshold may be defined as a number of clicks on a document (or an element within a document) within a time period. The threshold may be defined a frustration event by which a determination is made that a user is frustrated by interaction(s) with a document. For example, a frustration event may be detected based on multiple clicking ("rage clicking") on an interactive element 302 of a document as shown in FIG. 3. Upon detecting an event, the detection system may obtain information to store about the event. The information may be displayed in an interface (e.g., a graphical user interface) to enable a user to identify events that are detected and information about those events.

Upon detecting an event, data about the interaction with the electronic document is identified. The data may be identified in the information determined from monitoring interactions. The location of the document may be identified upon detecting the event. The location may be identified based on the source from which the document was obtained. For example, the location may be identified as the uniform resource information (URI) (e.g., a uniform resource locator (URL)) for the document. Upon detecting the event, the detection system can determine session information about a session that is active for providing the document, which is the subject of the event. The information gathered for the event may be stored by the detection system for analysis later. The data may be useful to determine a trend for events detected with respect to a user, a document, a site, or any other criteria related to events. For example, the detection system may record interactions, such as rage clicking, by recording information about the interactions, such as an element clicked for a rendered document, a location (x and y coordinates) of the mouse used for the interaction, the document URL, and session information (e.g., the documents the user traversed, user information, events which occurred in the session).

b. Detection of Rage Clicking Interaction Attributed to a Document Object Model (DOM) Change In some embodiments, the detection system may monitor information about a website that includes the document(s) for which interactions are monitored. The monitoring may be performed for a time period, which may be periodic or intermittent. The detection system may monitor operation to determine whether a document object model (DOM) of the website has changed based on the interaction(s) with a document associated with the website. Interaction (e.g., clicking) with an interactive element may occur frequently (e.g., repetitive succession) when a user is frustrated. A DOM can be monitored for a change to further assess a document for a frustration event. A DOM change may be determined by using a document interface, such as DOM Mutation Observer. A DOM can be checked to assist with the prevention of false-positives of frustration event detection. For example, detecting a change in a DOM based on a user clicking repetitively on a web page to increase a counter on a page may be identified as a false positive for a frustration event.

The detection system may monitor interaction with a document (e.g., interaction with one or more interactive elements rendered for the document) to determine that a DOM of a website for a document associated with the website may have changed. Upon detecting a change in the DOM for a website, the detection system may determine whether an interaction threshold (e.g., a DOM change interaction threshold) has been satisfied. An interaction threshold may be defined in part based on a DOM change threshold including one or more criteria for monitoring a DOM change. In one example, an interaction threshold may be defined by a number of clicks on a document and a DOM change, such that after a particular number of occurrences of a user clicking on an element without a DOM change occurring, a frustration event may be detected. Upon determining that the user clicked the same element within 2 seconds, and that no DOM changes have occurred, the detection system may continue to monitor the document. Upon detecting that the combination of a user clicking and no DOM change occurs after a threshold number of occurrences, the detection system may consider the interaction(s) a frustration event. The detection system may manage (e.g., create, read, and update) information (e.g., a counter) to keep track of occurrences of interaction(s) where a DOM does not change.

c. Detection of Rage Clicking Interaction Attributed to Performance with a Website The detection system can detect an interaction, such as multiple clicking (e.g., rage clicking), with a document of a website attributed to performance issues (e.g., slow response for a document of a website) for a website. Aside from monitoring response time of a web server providing documents for a website, each individual may have a varying level of patience as well as varying expectation of response time to access a document for a website due to their own personal experiences. As such, each user can have a custom threshold before they are frustrated with a specific server response time. By detecting frustration through user interactions after a navigation event, an individual's user frustration can be more accurately monitored at scale.

Figure 4:
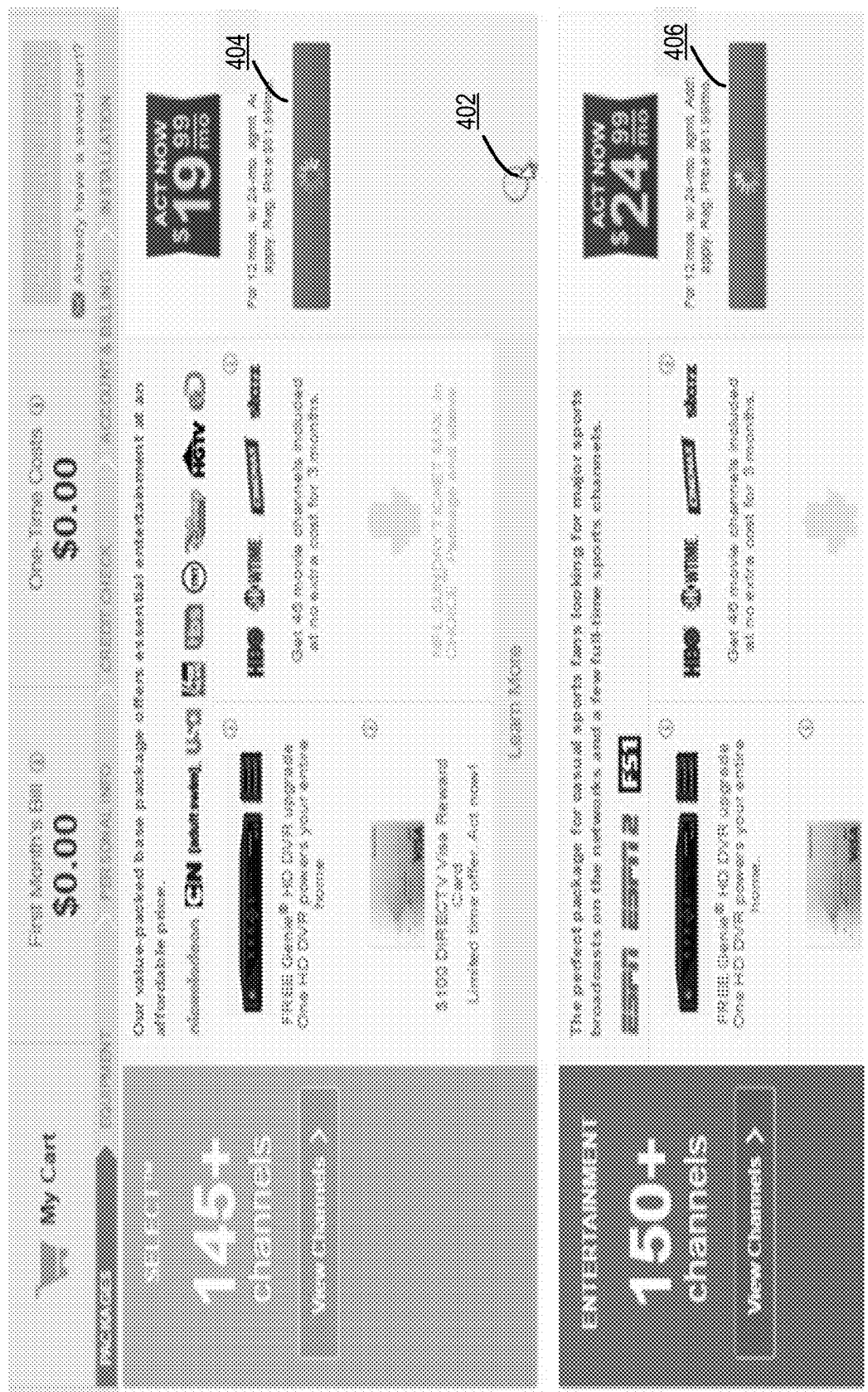

In at least one embodiment, the detection system may detect a frustration event based on multiple interactions (e.g., rage clicking) due to performance issues with navigating documents for a website. For example, when a user clicks a link of a web page to cause the browser to begin navigating to a different web page, if the user then clicks on the same link after one second, the second occurrence of clicking may be detected as rage clicking possibly due to performance of the website to which the document. To monitor the response or load time for a link, the detection system may use an interface accessible at a client device. The interface may provide functionality such as browser timings that exposes response/load time information. For AJAX (Asynchronous JavaScript and XML)/XMLHttpRequest (XHR) requests, the detection system can use a time function for a browser and compare time difference between sending a request and receiving a response. The detection system may record the click as a frustrated navigation event capturing information about the event such as the link clicked and other information as disclosed herein, such as the information and data gathered for rage clicking. FIG. 4 illustrates an example of a frustration event in which an interaction (e.g., clicking interaction 402) in a document is attributed to errors 404, 406 (e.g., "add to cart" buttons spinning due to delay response time) associated with a slow response time for a link in the document.

In at least one embodiment, the detection system may monitor a first document of a website. The interaction may include a first interaction with an interactive element during a time period and a second interaction with the interactive element during the time period. The first interaction may initiate a first request for a second electronic document of the website identified by the interactive element. The second interaction may initiates a second request for the second electronic document in response to the second electronic document not being received for the first request during the time period. An event may be detected based on repetitive interactions resulting in non-responsive API calls for the second document during a time period.

d. Detection of Application Programming Interface Error(s)/Performance Issues

In some embodiments, the detection system can monitor issues with loading a document for a website (e.g., loading interactive data for a web page). Loading a document may include calling an application programming interface (API), such as AJAX API calls. Errors in loading a document may be monitored such that the errors can be associated with interaction with a document identifying a frustration event. The detection system may monitor loading a document along with monitor interaction with the document. A poor user experience may be detected based on interaction with a document (e.g., repetitive clicking) occurring during an error in loading the document. By monitoring API calls, the detection system can attribute interaction with a document as bad user experiences tied to errors or performances issues with invoking an API call for the document. The detection system can enable an administrator to target users to determine whether some users are encountering a problem, such as errors in API calls.

The detection system may monitor a document according to a threshold defined for one or more errors associated with loading a document. The interaction threshold may be monitored along with a threshold for loading a document, such that a frustration event may be detected based on satisfying both thresholds. A threshold for loading a document may be defined by a response to a program call (e.g., an AJAX/XHR request) having an error code (e.g., 4xx or 5xx range) or by a response to a program call satisfying (e.g., exceeding) a response threshold (e.g., response threshold time). In at least one example, when a AJAX/XI-IR request is made for a web page, if a response to the request contains an error code (e.g., a code in the 3xx, 4xx, and/or 5xx range) or a response time is greater than a predetermined amount of time, the detection system may detect error in the call such that interactions with the document that is monitored may be attributed to the error as a frustration event. Examples of errors may include forbidden document errors, document not found errors, and errors based on too many redirects.

To monitor API call, such as AJAR/XI-IR calls, the detection system may replace an original call, once the call to execute the AJAX/XHR request is hooked, with a special function (e.g., a "shim") to allow for the notification of when the request is made and to obtain the response code. The detection system may capture the data sent and call the original send (and likewise monitor the response). Upon determining that the call has resulted in an error identified as a frustration event, the detection system may determine data about the event, the request, including the URL of the request, the response to the request, and the response code, along with other information about the document for which interaction occurs for the event. FIG. 3 illustrates an example of a frustration event in which an interaction (e.g., clicking interaction 302) in a document is attributed to errors 304, 306 (e.g., "add to cart" buttons spinning due to delay response time) associated with API calls detected for multiple elements in the document.

In at least one embodiment, the detection system may monitor communication with a server computer providing electronic documents for a website. The detection system can detect a response received from the server computer based on a request communicated to the server computer for an electronic document the website. Based on the detected response, the detection system can determine whether a response threshold is satisfied, the response threshold being defined for communication with the server computer. Upon determining that the response threshold is satisfied, the detection system can determine information in the request, identify a location of the electronic document for the website, and determine session information for related to interaction with one or more electronic documents of the website, the one or more electronic documents including the electronic document. The detection system can then store one or more of the information, the location, or the session information.

e. Detection of Interaction ("Click") Errors

The detection system may detect clicking attributes to an error in execution of code (e.g., embedded code) for a document. For example, the detection system may monitor a document that a user is interacting with to determine whether interaction with the document is related to an error in executing script code (e.g., JavaScript). An error in code for a document may be monitored by executing functionality for an API (e.g., window.addEventListener ("onerror")) that can listen for errors in execution of code for a document. Upon determining that an error has occurred in executing code for a document within a time period (e.g., 2 seconds) before a user interacts with the document, the detection system may detect the interaction as a frustration event. Upon detecting the error attributed to the frustration event, the detection system may determine information about the error and the interactions attributed to the error. Data about the event may be determined as disclosed herein for other frustration events. FIG. 3 illustrates an example of a frustration event in which an interaction (e.g., clicking interaction 302) in a document is attributed to code errors for a checkout process.

An error in code executed for a document may cause a frustration event because the code was likely supposed to be part of an interactive component of the document, for example, to transition between shipping to billing information during a checkout. If the code failed to run correctly, it is likely the document is in an unknown state, causing the user frustration due to an error in functionality. Because of the various different creators of browsers, and their associated JavaScript engines, along with various versions in current use by users, developers typically do not test all possible combinations of browser technology that is encountered in production. As such, documents for a website may not function properly resulting in frustration events identified based on repetitive interactions with the documents.

In at least one embodiment, the detection system may monitor an interaction with an electronic document of a website rendered by a client device, where the electronic document is structured based on a document object model (DOM) object of the website. Based on monitoring the interaction with the electronic document during a time period, the detection system may detect an error with execution of executable code initiated for the electronic document in response to the interaction. Data about the interaction with the electronic document may be detected. The detection system may identify a location of the electronic document for the website and may determine session information for the interaction with the website during the time period. The one or more of the data, the location, or the session information may be stored by the detection system.

f. Detection of Profanity Events

Figure 5:
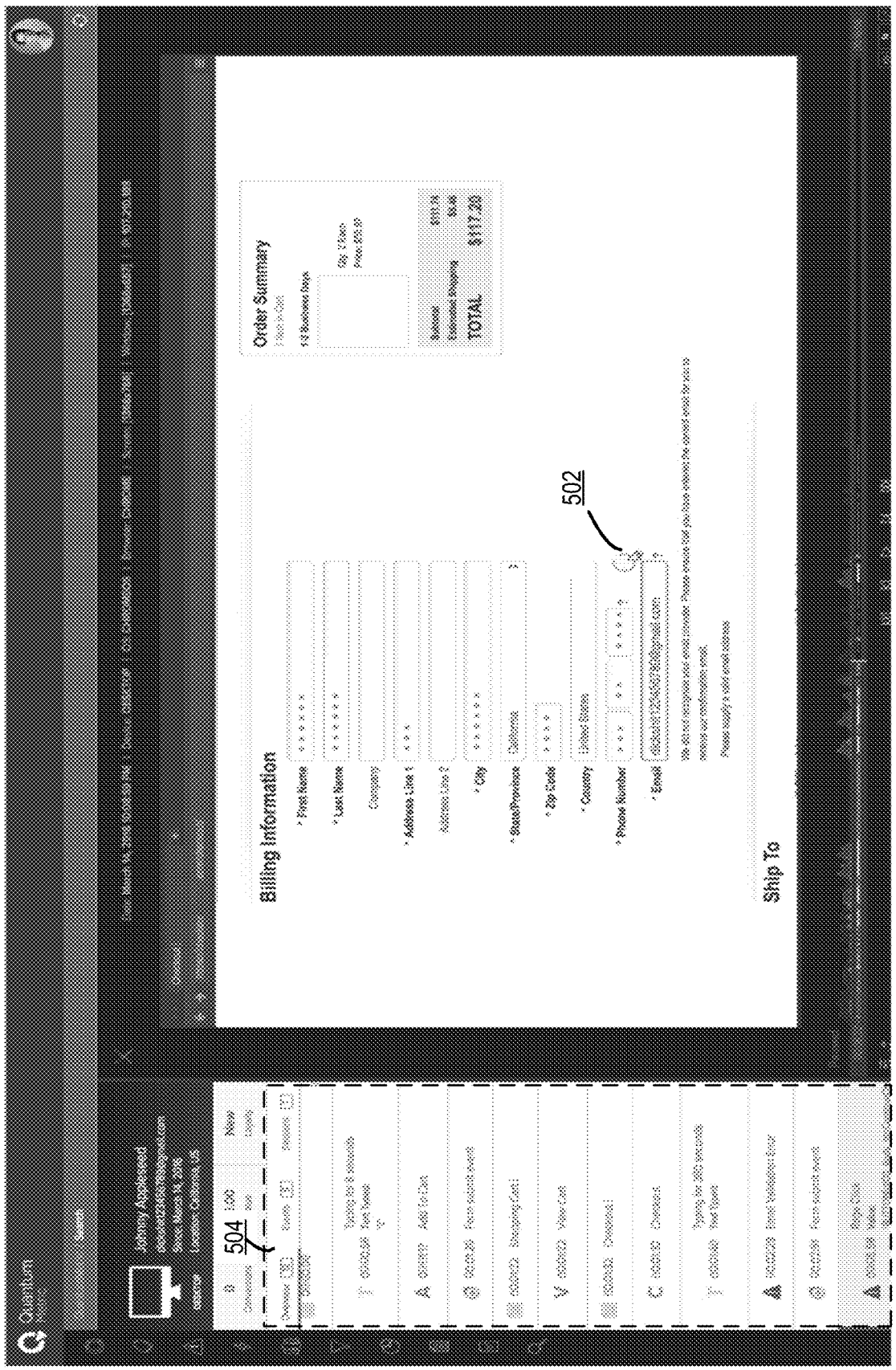

The detection system may detect a frustration event of a website as tied to a user's input or interaction of profanity with a document of the website. At times, when a user is frustrated by interacting with a website, the user may type profanity into an interactive element (as shown by element 502 of FIG. 5) or may aggressively interact with the website. Based on detection of a profanity event, the detection system may detect information about the event and associate the information in storage with the document. For example, the detection system may record the profanity. The detected information may be useful to a website operator to determine the circumstances in which a user is frustrated to improve operation of the website. In some embodiments, the detection system may provide one or more interfaces (e.g., a graphical user interface), such as graphical user interface 504 of FIG. 5, for viewing information about detection of a frustration event. The information may be provided in real-time along with a document that is being monitored. The information may indicate information about or leading up to the detection of a frustration event.

In at least one embodiment, the detection system may monitor interaction with an electronic document of a website rendered by a client device, where the electronic document is structured based on a document object model (DOM) object of the website. Based on monitoring the interaction with the electronic document during a time period, the detection system may detect that the interaction includes an input to an interactive element of the electronic document. The input may be analyzed to determine whether the input includes a user-defined data (e.g., user-defined profanity). Upon determining that the input includes user-defined data, the detection system may: 1) detect data the interactive element the electronic document; 2) identify a location of the electronic document for the website; and/or 3) determine session information for the interaction with the website during the first time period. The detection system may store one or more of the input, the data, the location, or the session information.

g. Detection of Repetitive Steps

The detection system can detect user frustration in the event that a user is performing repetitive steps caused by repetitive interaction with one or more documents of a website. A frustration event may be detected when a user is interacting with a website that continues to redirect the user through the same process. Often times, an error or frustrating user experience can typically be discovered when users are repeating the same checkout step over and over. In one example, the detection system may determine whether a user revisits the same document, which may be identified by a URL or content appearing in the document, as part of a process (e.g., a checkout process) on the website. The detection system may be able to analyze code that is being executed for a repeated process to determine whether a process has been repeated. A threshold may be defined whereby the detection system determines that a frustration event has occurred because the threshold for repeating the process has been reached. Information about the website, such as the document(s) involved with the repetitive process, may be recorded for association with the frustration event. The detection system may manage information (e.g., a counter) to keep track of occurrences of a process. By detecting a frustration event related to a repeated process, a website can be improved to streamline the process to dramatically increase conversions.

In at least one embodiment, the detection system can monitor interaction with an electronic document of a website rendered by a client device, where the electronic document is structured based on a document object model (DOM) object of the website, and where the electronic document is located associated with a location on a server computer and is interactive to initiate a transaction with a merchant. Based on monitoring the interaction with the electronic document, the detection system can determine whether the electronic document has been loaded a threshold amount at the client device. Upon determining that the electronic document has been loaded the threshold amount, the detection system can: 1) identify a location of the electronic document for the website; 2) determine session information for the interaction with the website during the time period; and/or 3) store one or more of the location or the session information.

Figure 6:
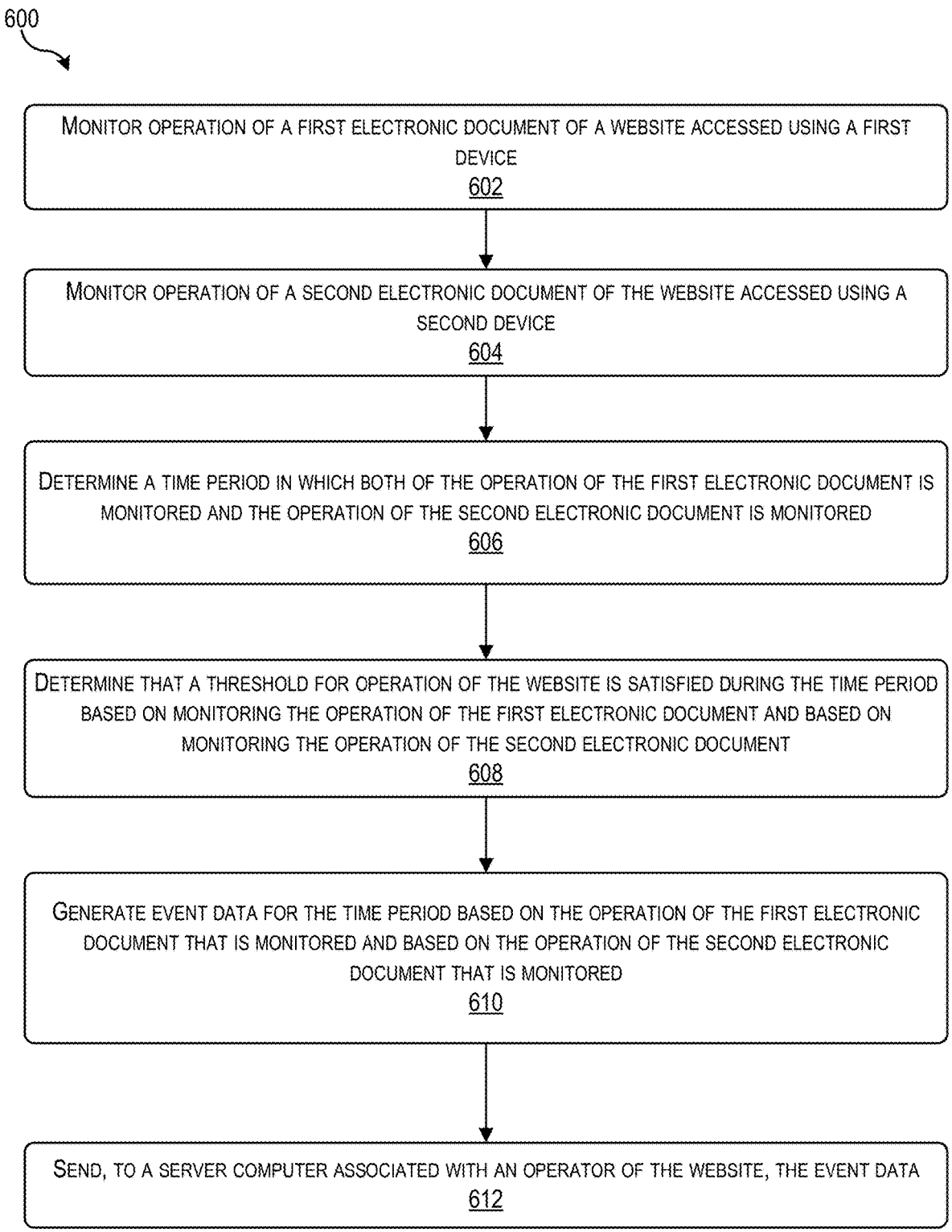
FIGS. 6 and 7 illustrate flowcharts of processes for detecting events related to interaction with and operation of a website according to some embodiments.
Figure 7:
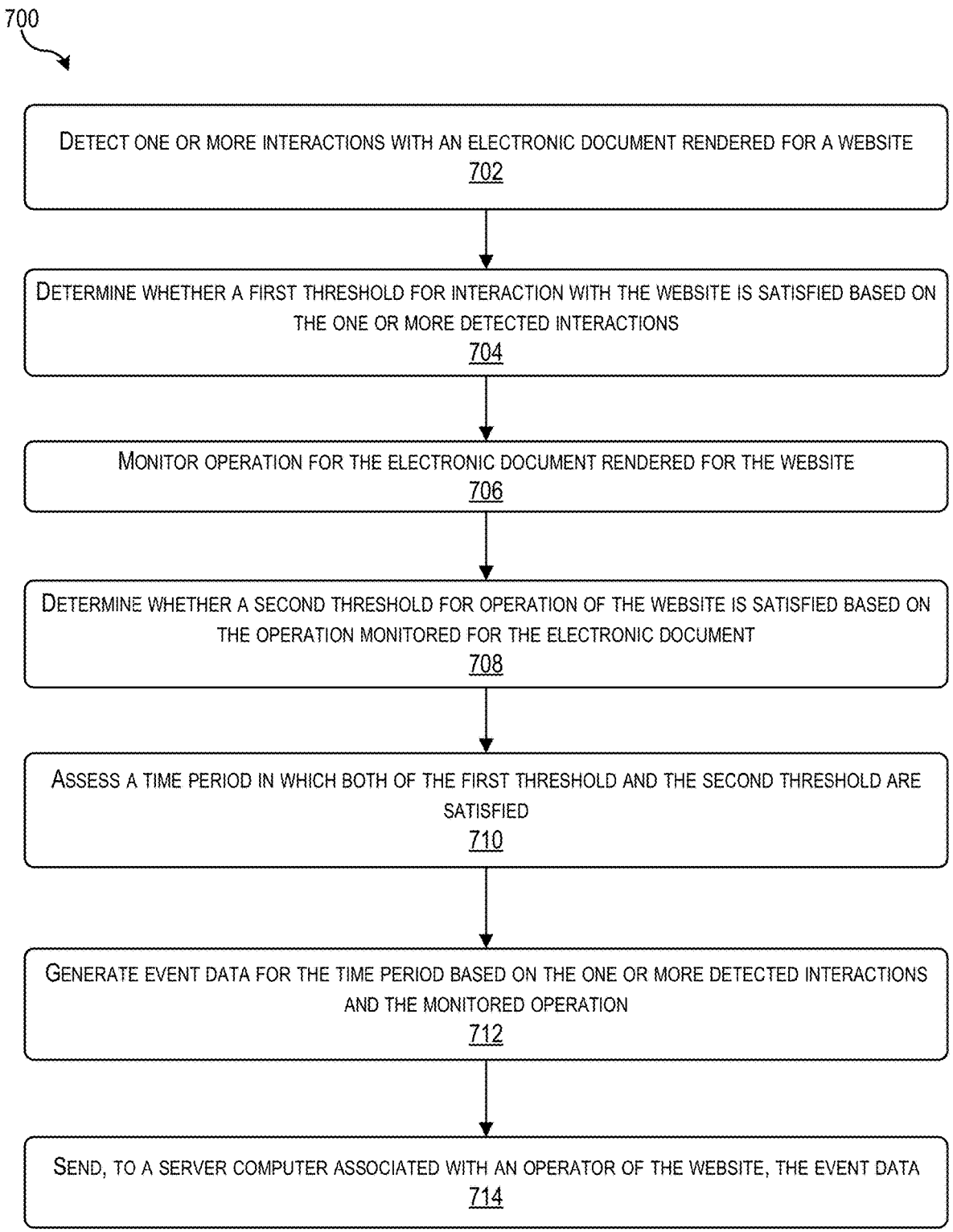

III. Processes for Detecting Events Related to Interaction with and Operation of a Website FIGS. 6 and 7 illustrate flowcharts of techniques for determining events (also referred to as "frustration events") for a website. Specifically, the techniques include determining events based on monitoring operation of and interactions with a website. Events (or "frustration events") may include or correspond to problems, issues, delays, errors, or other types of events that impact operation and/or interaction with use of any portion of a website. Such events may be the cause of frustration affecting performance, operation, and use of a website. Monitoring operation may include monitoring interaction with documents of the website. The techniques described with reference FIGS. 6 and 7 may be implemented by one or more computer systems, including frustration event detection system 130, device 102, or a combination thereof.

FIG. 6 illustrates a flowchart 600 of techniques for determining events based on operation of one or more documents of a website. The techniques may include a process by which operation of one or more documents of a website may be monitored across one or more devices (e.g., client devices). Often times, an issue affecting operation or use of a website may not be detectable across different documents of a website, much less documents accessed by different devices operated by different users. In many cases, different issues may be impacting the operation and use of a website in different ways across different documents. The issues may be related to the same problem, and ultimately the issues may signify a general issue affecting the operation and use of a website. The issues may go unnoticed or may be difficult to correlate or detect across multiple different documents accessed by one or more devices. The discovery of events impacting operation of a website may be difficult to detect and may be useful for adjusting and improving operation of a computer system (e.g., a server computer) of a host system that hosts a website.

Flowchart 600 may begin in a variety of ways, not limited to an order in which the blocks of flowchart 600 are shown. One or more blocks of flowchart 600 may implement techniques to monitor operation of and/or interaction with one or more documents of a website accessed from one or more devices.

Flowchart 600 includes block 602 and block 604. At block 602, operation of an electronic document (e.g., a first electronic document) of a website, accessed using a device (e.g., a first device), may be monitored. At block 604, operation of another electronic document (e.g., a second electronic document) of the website, accessed using a device (e.g., a second device), may be monitored. The first electronic document may be the same, or identical, as the second electronic document. The first device may be the different or identical to the second device. The electronic documents may be accessed on multiple instances when the first device is identical to the second device. Monitoring operation of a document of a website may include assessing, or monitoring rendering of the document, one or more functions or features in the document, interaction within or with an element of the document, execution of one or more instances of a set of instructions, or any other function or process that relates to presentation and access of a document of the website.

In at least one embodiment, event detection system 130 can monitor operation of a website accessed by multiple client devices. Detection agent 152 on client device 102 may monitor input to and operation of a website accessed on a client device. Detection agent 152 may be configured to cause client device 102 send data to event detection system 130. The data may include information about inputs and/or interactions that are detected at client device 102 and/or data about operation of an electronic document being rendered at client device 102. Event detection system 130 can monitor operation of and/or interaction with a website based on the data received from detection agent 152.

Techniques for monitoring a website, and/or one or more documents of the website, may be implemented using techniques disclosed with reference to Section II "Techniques for Detecting Events Related to Interaction With and/or Operation of a Website." In some embodiments, monitoring operation of the first electronic document may include detecting one or more interactions (e.g., first interactions) with the first electronic document. Monitoring operation of the second electronic document may include detecting one or more interactions (e.g., second interactions) with the second electronic document. Interactions may be detected based on one or more inputs to the device with respect to an electronic document.

At block 606, a time period is determined for when operation of a first electronic document and operation of a second electronic document are monitored. To identify possible issues with operation of a website, the time period may be useful in determining whether operation of individual documents for a website were monitored during a time period, and if so whether a threshold is satisfied for the operation(s) monitored during that time period. Electronic documents may be accessed by the same or different users during a time period.

At block 608, a threshold for operation of a website is assessed to determine whether the threshold is satisfied during the time period determined at block 606. A website may be monitored based on one or more thresholds, each of which may correspond to operation of or interaction with the website. A threshold may be defined based on one or more attributes related to operation of a website. Each attribute may be defined by a value representing that attribute.

Attributes may include interaction (e.g., mouse clicks) and/or operation (e.g., reloading a page) related to a website. The attributes may include those, for example, described with reference to interactions and operations in Section II "Techniques for Detecting Events Related to Interaction With and/or Operation of a Website." The threshold(s) may be configurable with respect to monitoring operation of a website to detect frustration events. The threshold may be assessed based on monitoring operation of one or more electronic documents accessed across one or more devices. For example, a threshold may be assessed based on monitoring operation of a first electronic document and based on monitoring operation of a second electronic document for a website. The threshold may be configured for different operations of and/or interaction with the website. The data based on monitoring operation of the website monitored for a first electronic document and a second electronic document during the time period may be assessed to determine whether the operation during the time period satisfies the threshold.

At block 610, event data including a classification of operation for the website during the time period is generated. The event data for the time period based on the operation of the first electronic document that is monitored and based on the operation of the second electronic document that is monitored. The event data may include interaction information, session information, and a location of each of the electronic document(s) monitored during the time period. For example, the event data includes first information about the operation of the first electronic document monitored for the website and second information about the operation of the second electronic document monitored for the website. The event data may be useful for a server computer hosting a website to assess and/or possibly alter operation of the website and/or inform users.

Generating the event data may include generating a classification for operation of the website. As described in this disclosure, the monitoring of operation of documents for a website and the threshold(s) that are satisfied can be assessed with respect to possible issues with operation of a website. A classification may be defined based on one or more thresholds that are satisfied during a time period. Examples of classifications are described with reference to Section II "Techniques for Detecting Events Related to Interaction With and/or Operation of a Website." For example, a threshold may be defined for one type of interaction that is satisfied based on monitoring operation of electronic documents accessed for a website by different client devices.

At block 612, the event data is sent to a computer system (e.g., a server computer), such as computer system 140. The computer system may be associated with an operator of a website which is monitored. The event data may be used by the computer system to adjust operation of the website by the computer system. Information in the event data may be displayed at the computer system to provide an indication as to the operation of a website. In some embodiments, the operation of the website, or specific documents rendered for the website may be altered to address issues based on satisfying a threshold. The website may provide information in the event data and/or communicate the information to client devices to inform users about operation of the website.

Now turning to FIG. 7, a flowchart 700 of techniques for determining events based on operation of one or more documents of a website is illustrated according to some embodiments. In some instances, an electronic document for a website may encounter an issue with its operation that can be detected on the basis of different interactions with and/or operation of the website. Individually, each interaction with and/or different operation of a document of a website may not be causing an issue. A computer system hosting a website may be unable to determine a trend in operation of a website based on one or more users accessing a document. Specifically, separate events related to operation of or interaction with a website for the same or different documents may not be correlated as relating to a single issue. Techniques disclosed with reference to flowchart 700 illustrate how monitoring operation of a document for a website and interactions with the document may collectively be assessed with respect to multiple thresholds to detect and classify an event related to an issue with operation of a website.

Flowchart may include blocks for monitoring interaction(s) with a document for a website and assessing the interaction(s) with respect to one or more thresholds. Flowchart may include blocks for monitoring operation(s) of a document for a website and assessing those operation(s) with respect to one or more thresholds.

In at least one embodiment, at block 702, one or more interactions with an electronic document rendered for a website are monitored. Interactions may be monitored using techniques disclosed herein. One or more interactions may be detected based on monitoring. At block 704, a threshold for interaction with the website (e.g., a first threshold) is assessed to determine whether the threshold is satisfied based on the one or more detected interactions. The threshold for interaction with the website may be based on a measure of one or more interactions (e.g., one or more mouse clicks) with the electronic document. For example, the threshold may be defined for monitoring rage clicking interaction with a document on the basis of multiple interactions with a document.

Detecting one or more interactions with a document may include determining that the one or more interactions correspond to one or more inputs to an element presented for the document. A threshold of interaction with the website may be based on either or both of the interactions or the actual data input. The input(s) may be processed to determine whether it includes user-defined data. User-defined data may correspond to information that is not permitted or indicative of frustration (e.g., profanity) for interaction with a document.

In at least one embodiment, at block 706, operation for an electronic document rendered for the website is monitored. The electronic document may be different or identical to the electronic document for which one or more interactions are detected. At block 708, a threshold (e.g., a second threshold) for operation of the website is assessed to determine whether the threshold is satisfied based on the operation monitored for the electronic document.

Monitoring operation for one or more electronic documents rendered for a website may include monitoring those documents for a change in a document object model (DOM) object of the website. The document(s) may be structured based on the DOM object. Monitoring operation may include detecting, based on the one or more interactions, a change in a document object model (DOM) object of the website. The website may be structured based on the DOM object. In this example, interactions with and operations of a website are monitored together as they related to each other. A threshold for operation of a website may be related to and/or based on a DOM change. For example, a threshold may be defined based on one or more of a type of change to a DOM object, a frequency of changes, other types of changes, or combinations thereof. The second threshold may be related to a DOM change. Determining whether the second threshold for operation of the website is satisfied based on the operation monitored for the electronic document may include determining whether the detected change in the DOM object satisfies the DOM change of the second threshold.

At block 710, a time period in which one or more thresholds are satisfied is assessed. For example, based on determining that a threshold at block 704 and a threshold at block 708 are satisfied, a time period is determined for when both thresholds are satisfied. As discussed above, a computer system hosting a website may be interested in detecting an issue with operation of the website such that it may be desirable to monitor multiple thresholds, one for interaction with the website and another for operation of the website. Identifying a time period when both thresholds are satisfied may be indicative of a potential issue with the website, or more specifically with a document provided for the website.

In at least one embodiment, monitoring the operation for an electronic document comprises determining an amount of requests to load the electronic document for the website. The second threshold may include a threshold amount of requests to load one or more electronic documents of the website. This technique may be implemented to monitor operation of a website based on reload requests to access a document. A measure of requests to load a document may contribute or in itself be identified as a frustration event affecting operation of a website. In some embodiments, operation of and interaction with a website may be important to monitor collectively for all or a portion of a website involved in a process of commerce (e.g., a checkout process). A process of commerce may be critical for an operator of a website such that frustration events detected may impact commerce for the operator. For example, monitoring the operation for the electronic document may include determining whether the electronic document is associated with a process of commerce facilitated by the website. Monitoring the operation for an electronic document may include determining that the document is in a set of documents part of a process of commerce. Processing may be performed to determine whether the document(s) are part of a checkout process or some other process involved with commerce through the website. The amount of requests may be determined to assess whether the document(s) are being rendered and/or operation for the document(s) is being performed for a checkout process based on interaction with the document(s).

In at least one embodiment, detecting the one or more interactions with an electronic document (e.g., a first electronic document) comprises detecting a plurality of interactions with an interactive element of the electronic document. The interactive element being configured, upon the interaction, initiates a request for a different electronic document (e.g., a second electronic document). Monitoring the operation for the first electronic document comprises determining whether display of the first electronic document has changed to render the second electronic document based on the plurality of interactions. By implementing this technique where interactions in one document can be monitored along with operations for rendering a second document, the operation of the website can be assessed with respect to the ability of the second document to be rendered based on interaction with the first document. The techniques implemented in flowchart 700 may enable a classification to be determined whether these interactions whether the interactions and operation are a frustration event.

In some embodiments, multiple different types of interactions may be monitored and detected. A threshold may be defined based on one or a combination of interactions, which could be of different types of interactions. Multiple interactions of the same type may be detected. Multiple interactions with the same element may be monitored to determine whether an issue exists with operation of the element and/or loading of another electronic document based on interaction with the same element. For example, a first interaction with an element of a first electronic document of a website may be detected. The first interaction may initiate a first request for a second electronic document. In this example, a second interaction with the same element of the first electronic document may be detected. The second interaction may initiate a second request for the second electronic document. The interactions and the requests may be detected during the time period during which the threshold is satisfied based on the detected interactions. The second request may be initiated in response to the second electronic document not being received for the first request during the time period.

Monitoring operation of a website for a document may include monitoring one or more requests related to the document that is communicated from a device at which the document is accessed. The document may be accessed at a device from a computer system that hosts the website. Monitoring operation of a website for a document may include identifying each response by a computer system to which the request(s) were communicated. A second threshold for monitoring operation of a document may include a response threshold for communication with the computer system that hosts the website. Determining whether the second threshold is satisfied includes determining whether the response threshold is satisfied upon receiving the response from the computer system that hosts the website.

At block 710, event data may be generated for a time period based on the interaction(s) and/or operations of document(s) that are monitored. For example, event data may be generated based on operation of a document that is monitored at block 706 and based on one or more interactions that are detected at block 702.

In at least one embodiment, the event data includes information (e.g., first information) about one or more interactions that are detected. The event data may be generated to include the information. Flowchart 700 may include determining interaction information about the one or more detected interactions with the electronic document. The one or more interactions may be with an interactive element of the electronic document. The interaction information may indicate a location of the one or more detected interactions on a display of the electronic document. The interaction information may include a location or a position (e.g., coordinates) and/or a number of selections corresponding to input to a graphical user interface (GUI) the one or more interactions that are detected with a document. The interaction information may be based on the user-defined data. For example, the interaction information may include the information that was input into an element rendered with the document. Techniques for determining the interaction information are disclosed with reference to Section II "Techniques for Detecting Events Related to Interaction With and/or Operation of a Website." The interaction information may be included in the first information of the event data.

In at least one embodiment, the event data includes information (e.g., second information) about operation of a website, or one or more documents of the website, that are monitored. Flowchart 700 may include determining second information. Second information may include information in the one or more requests that are monitored. Second information may include information about detected errors in execution of an instance of instructions. Second information may include information about errors that are detected from or based on interactions that are detected.

In at least one embodiment, the event data includes information identifying a location of an electronic document for which interactions are detected and/or operation is monitored. Flowchart 700 may include identification a location of an electronic document that is monitored for operation and that is monitored to detect interactions. The location may be identified based on the source from which a document was obtained. For example, the location may be identified as the uniform resource information (URI) (e.g., a uniform resource locator (URL)) for the document. The location information may be included in the first information of the event data.

In at least one embodiment, the event data includes session information for the one or more detected interactions with the website. Flowchart 700 may include determining session information for accessing the website. The session information may be determined for the time period during which threshold(s) are satisfied.

Generating event data may include determining a classification of operation for a website based on monitoring the operation of the website and/or detecting one or more interaction(s) with document(s) of the website. Flowchart 700 may include computing a value (e.g., a first value) based on applying a weight (e.g., a first weight) to a measure of the one or more interactions detected in the time period. The measure of the one or more interactions may be a count of the total number of interactions or specific types of interactions. The weight may be based on the significance given to the interactions with respect to the type of event to be detected. The value may be an aggregate of the different measures of types of interactions, each being weighted. The value may be an average measure or a total measure of the interactions.

Flowchart 700 may include computing a value (e.g., a second value) based on applying a weight (e.g., a second weight) to a measure of operation monitored for the electronic document. Depending on the operation being monitored, the measure may be representative of a number of occurrence of the operation being monitored. Multiple measures, each with a respective weight, may be considered for the value for operation of a website. The weight may be based on the significance given to the operations with respect to the type of event to be detected. The value may be an aggregate of the different measures of types of operations that are monitored, each being weighted. The value may be an average measure or a total measure of the operations. Flowchart 700 may include determining a classification for operation of a website, or specifically classification of one or more documents of the website based on the value(s) computed based on the measure of the operations that are monitored.

Flowchart 700 may include determining a classification of operation of a website, or specifically one or more documents of a website based on one or more of the values that are computed according to the measure(s) of the operation of and/or interaction with the website. The classification may be based on the values in combination. The classification may be based on a scale of values, which represent different classifications on status of operation of a website. The classification may be indicative of or used to determine whether the operation of and/or interaction with the website is a frustration event. Severity of frustration can be assessed based on the classification which is determined considering different weights for the values used to compute those values. The classification may be based on assessment using multiple scales, each of the scales corresponding to each of the values computed. The classification may be defined based on one or more thresholds which are defined by the values, of which the combination dictates the classification.

In some embodiments, monitoring interaction and monitoring operation of a website may be dependent on each other. For example, one or more interactions are detected with the electronic document of a website. The interactions may initiate execution of an instance of a set of instructions (e.g., embedded code) for the document. Monitoring operation of the website for the electronic document may include detecting an error with the execution of the instance of the set of instructions in response to the interaction(s). The first threshold for the detected interactions may be a frequency of the interactions, and the second threshold may be a duration of time between the interaction(s) and detection of one or more errors with execution of the instance of the set of instructions. Flowchart 700 may include detecting data about the interaction with the electronic document. The information included in the event data may include the data detected about the one or more detected interactions. Event data may include error information about the detected errors.

At block 712, event data generated at block 710 is sent to a computer system (e.g., a server computer). The computer system may be associated with an operator of a website which is monitored. The event data may be used by the computer system to adjust operation of the website by the computer system. Information in the event data may be displayed at the computer system to provide an indication as to the operation of a website. In some embodiments, the operation of the website, or specific documents rendered for the website may be altered to address issues based on satisfying a threshold. The website may provide information in the event data and/or communicate the information to client devices to inform users about operation of the website.

IV. General Computer System

Figure 8:
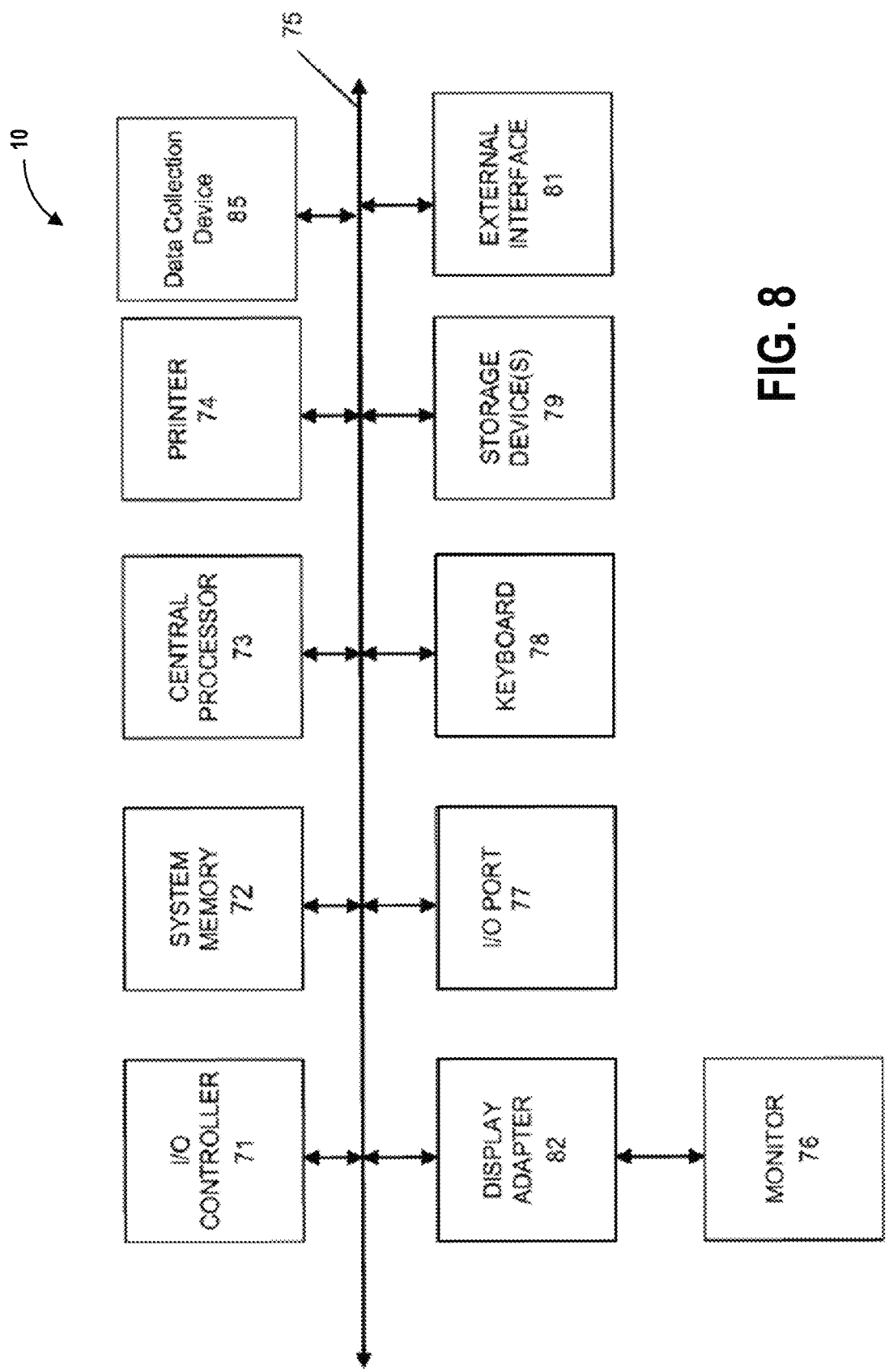
FIG. 8 illustrates a block diagram of an example computer system for implementing some embodiments.

Any of the computer systems mentioned herein may utilize any suitable number of subsystems. Examples of such subsystems are shown in FIG. 8 in computer apparatus 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 8 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present disclosure can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional, functional, and/or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. In addition, all or portions of a step may be optional. Additionally, any of the steps of any of the methods can be performed with modules, circuits, or other means for performing these steps.

The features and advantages described in the detailed description are not all inclusive and, in particular, many additional features and advantages will be apparent to one of ordinary skill in the art in view of the drawings, detailed description, and claims. Moreover, it should be noted that the language used in the detailed description has been principally selected for readability and instructional purposes, and may not have been selected to delineate or circumscribe the inventive subject matter.

Note that in this description, references to "one embodiment," "an embodiment" or "some embodiments" mean that the feature being referred to is included in at least one embodiment of the present disclosure. Further, separate references to "one embodiment" or "some embodiments" in this description do not necessarily refer to the same embodiment(s); however, neither are such embodiments mutually exclusive, unless so stated and except as will be readily apparent to those skilled in the art. Thus, the present disclosure can include any variety of combinations and/or integrations of the embodiments described herein. However, other embodiments of the present disclosure may be directed to specific embodiments relating to each individual aspect, or specific combinations of these individual aspects.

Upon reading this detailed description, those of skill in the art will appreciate still additional alternative structural and functional designs for a system and method for compact data storage of network traffic and efficient search through the disclosed principles of the present disclosure. Thus, while particular embodiments and applications of the present disclosure have been illustrated and described, it is to be understood that the present disclosure is not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the present disclosure as defined in the appended claims.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A computer-implemented method comprising performing, by a client device:
   receiving, by a detection agent executing on the client device, interaction data corresponding to one or more user interactions detected with an electronic document rendered from a website on a web server, wherein the detection agent is received by the client device from the website in response to a request for a web page of the website;
   determining, by the detection agent, whether a first threshold for interaction with the website is satisfied based on the one or more user interactions detected with the electronic document;
   determining, by the detection agent, an amount of change in a document object model (DOM) object of the website, wherein the electronic document is structured based on the DOM object of the website;

determining, by the detection agent, whether a second threshold is satisfied by comparing the determined amount of change in the DOM object to the second threshold; and in response to determining that the first threshold is satisfied during a time period and that the second threshold is satisfied during the time period:

generating, by the detection agent, event data for the time period based on the one or more user interactions with the electronic document during the time period and the determined amount of change in the DOM object of the website.

2. The computer-implemented method of claim 1, wherein generating the event data comprises:

computing a first value based on applying a first weight to a measure of the one or more user interactions detected with the electronic document during the time period;

computing a second value based on applying a second weight to a measure of one or more communications between the client device and a web server corresponding to an operation of the website during the time period; and determining a classification of the operation for the website based on the first value and the second value.

3. The computer-implemented method of claim 1, wherein determining the amount of change in the DOM object of the website comprises:

monitoring, by the detection agent, communications between the client device and a web server providing web content to the client device, the communications corresponding to an operation of the website on the client device.

4. The computer-implemented method of claim 3, wherein monitoring communications between the client device and the web server corresponding to the operation of the website comprises:

identifying a source location of the electronic document; and determining session information for accessing the website by the client device.

5. The computer-implemented method of claim 3, wherein monitoring the communications between the client device and the web server corresponding to the operation of the website comprises:

monitoring one or more requests that are related to the electronic document and that were communicated from the client device to the web server that hosts the website;

identifying a response received from the web server based on monitoring the one or more requests;

wherein the second threshold includes a response threshold for communication with the web server, and wherein determining whether the second threshold is satisfied includes determining, based on the response, whether the response threshold is satisfied upon receiving the response from the web server.

6. The computer-implemented method of claim 5, further comprising:

determining information in the one or more requests that are monitored, wherein the generated event data includes the information.

7. The computer-implemented method of claim 3, wherein the one or more detected user interactions with the electronic document includes a first interaction initiating execution of an instance of a set of instructions;

wherein monitoring communications between the client device and the web server corresponding to an operation of the website comprises: detecting an error with the execution of the instance of the set of instructions in response to the first interaction; and wherein the second threshold is a duration of time between the first interaction and detection of the error with the execution of the instance of the set of instructions.

8. The computer-implemented method of claim 7, further comprising:

detecting data about the first interaction with the electronic document, wherein generation of the event data includes the detected data about the first interaction and includes error information about the detected error.

9. The computer-implemented method of claim 3, wherein monitoring communications between the client device and the web server corresponding to the operation of the website comprises determining an amount of requests to load the electronic document for the website, and wherein the second threshold includes a threshold amount of requests to load one or more electronic documents of the website.

10. The computer-implemented method of claim 1, wherein the one or more user interactions corresponds to an input to an element of the electronic document;

wherein the method further comprises:

determining that the input includes a user-defined data, wherein the generated event data is based on the user-defined data.

11. The computer-implemented method of claim 1, wherein the one or more detected user interactions include one or more user interactions with an interactive element of the electronic document, and wherein the generation of the event data is based on a location of the one or more detected user interactions on a display of the electronic document.

12. The computer-implemented method of claim 1, wherein the first threshold for interaction with the website is based on a measure of one or more user interactions with the electronic document.

13. The computer-implemented method of claim 1, wherein the electronic document is a first electronic document, wherein the one or more detected user interactions with the electronic document includes a first user interaction with an element of the first electronic document during the time period and a second user interaction with the element during the time period, wherein the first user interaction initiates a first request for a second electronic document of the website identified, and wherein the second user interaction initiates a second request for the second electronic document in response to the second electronic document not being received for the first request during the time period.

14. The computer-implemented method of claim 1, further comprising:

sending, by the detection agent, the event data to a server computer associated with an operator of the website.

15. The computer-implemented method of claim 1, further comprising:

redirecting, by the detection agent, from the website to a server to provide support; or triggering one or more changes to the website based on the event data.

16. A system, comprising:

one or more processors; and one or more memory devices comprising instructions that, when executed by the one or more processors, cause the one or more processors to perform operations comprising:

receiving interaction data from a detection agent executing on a client device, the interaction data corresponding to one or more user interactions detected with an electronic document rendered from a website;

determining whether a first threshold for interaction with the website is satisfied based on the one or more detected user interactions;

determining an amount of change in a document object model (DOM) object of the website, wherein the electronic document is structured based on the DOM object of the website;

determining whether a second threshold is satisfied by comparing the determined amount of change in the DOM object to the second threshold; and in response to determining that the first threshold is satisfied during a time period and that the second threshold is satisfied during the time period:

generating event data for the time period based on the one or more detected user interactions and the determined amount of change in the DOM object of the website.

17. The system of claim 16, wherein the one or more detected user interactions include one or more user interactions with an interactive element of the electronic document, and wherein the generation of the event data is based on a location of the one or more detected user interactions on a display of the electronic document.

18. The system of claim 16, wherein determining the amount of change in DOM object of the website comprises:

monitoring communications between the client device and a web server providing web content to the client device, the communications corresponding to an operation of the website on the client device.

19. The system of claim 18, wherein monitoring communications between the client device and a web server corresponding to the operation of the website comprises:

identifying a source location of the electronic document; and determining session information for accessing the website by the client device.

20. The system of claim 18, wherein monitoring the communications between the client device and the web server corresponding to the operation of the website comprises:

monitoring one or more requests that are related to the electronic document and that were communicated from the client device to the web server that hosts the website; and identifying a response received from the web server based on monitoring the one or more requests, wherein the second threshold includes a response threshold for communication with the web server, and wherein determining whether the second threshold is satisfied includes determining, based on the response, whether the response threshold is satisfied upon receiving the response from the web server.

21. The system of claim 18, wherein monitoring communications between the client device and the web server corresponding to the operation of the website comprises determining an amount of requests to load the electronic document for the website, and wherein the second threshold includes a threshold amount of requests to load one or more electronic documents of the website.

22. The system of claim 18, wherein the one or more detected user interactions with the electronic document includes a first interaction initiating execution of an instance of a set of instructions;

wherein monitoring communications between the client device and the web server corresponding to the operation of the website comprises: detecting an error with the execution of the instance of the set of instructions in response to the first interaction; and wherein the second threshold is a duration of time between the first interaction and detection of the error with the execution of the instance of the set of instructions.

* * * * *